(No Model.)

F. M. BROWN & E. J. BROSNAN.
PNEUMATIC TIRE.

No. 565,258. Patented Aug. 4, 1896.

WITNESSES
R. H. Newman
Harriet L. Slason

INVENTORS
FRED M. BROWN
EDWARD J. BROSNAN
By Chamberlain & Newman Atty.

UNITED STATES PATENT OFFICE.

FRED M. BROWN AND EDWARD J. BROSNAN, OF STAFFORD, CONNECTICUT, ASSIGNORS OF ONE-THIRD TO CHARLES L. JOHNSON, OF SAME PLACE.

PNEUMATIC TIRE.

SPECIFICATION forming part of Letters Patent No. 565,258, dated August 4, 1896.

Application filed March 27, 1896. Serial No. 585,064. (No model.)

*To all whom it may concern:*

Be it known that we, FRED M. BROWN and EDWARD J. BROSNAN, citizens of the United States, and residents of Stafford, in the county of Tolland and State of Connecticut, have invented certain new and useful Improvements in Pneumatic Tires, of which the following is a specification.

This invention relates to new and useful improvements in pneumatic tires, such as are used upon bicycles, tricycles, carriages, and like vehicles.

It is the object of our invention to provide for tires of the above class a non-puncturable shield, which can be inclosed between the layers of the material of the tire, or which may be formed within the solid-rubber portion thereof. We also construct said shield in such a manner as to insure the same readily yielding, and thus flattening the tire by the pressure thereon. We construct said shield in such a manner as to positively prevent punctures by ordinary means, and further cheapen and simplify its construction, and in other ways render it more practical than has heretofore been done.

With the above objects in view we have devised the simple and novel construction shown upon the accompanying drawings, which form a part of this specification, and of which—

Figure 1:
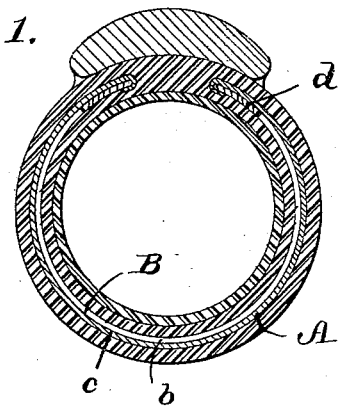
Figure 2:
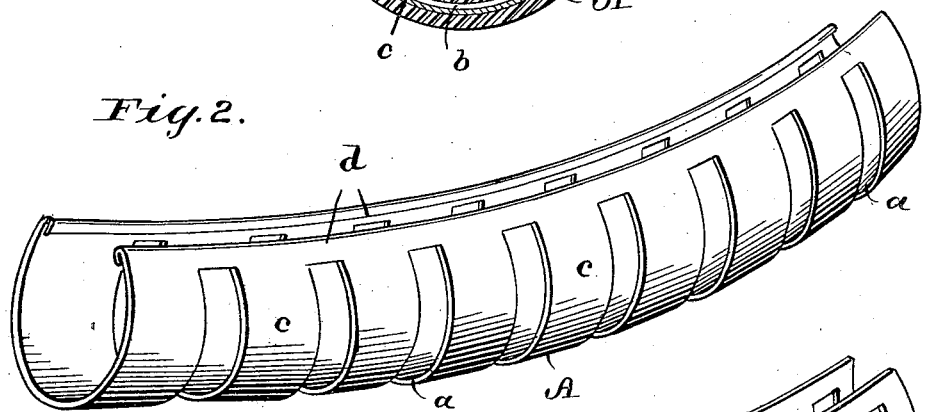
Figure 3:
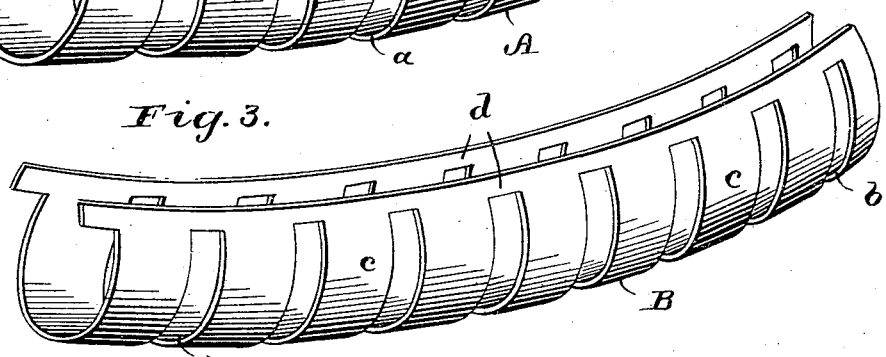
Figure 4:
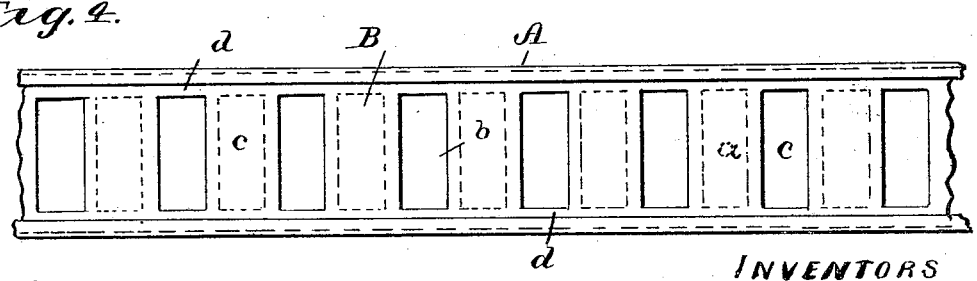

Figure 1 shows a cross-section of a wheel-rim having a pneumatic tire thereon constructed after the principles of our invention. Fig. 2 shows a perspective view of a short section of the outer curved strip A, which constitutes a part of the shield. Fig. 3 is a similar perspective view of the inner strip B, which, together with the strip shown in Fig. 2, constitutes the shield proper. Fig. 4 indicates a diagram view showing the manner in which the two strips are assembled and the relative positions of their perforations.

As will be seen, our invention consists substantially of an outer and an inner convex strip A and B, both of which practically encircle the tire in such a manner as to fully protect the same from punctures, both upon the tread and sides, and at the same time afford it such resiliency as may be desirable to insure the tire readily yielding to the pressure brought to bear upon it, thus allowing the same to pass over uneven and irregular surfaces in the usual and desirable manner.

We accomplish the above results in a practical manner by forming these strips A and B of very thin yieldable sheet metal, such as spring-steel, and provide the same with a series of perforations $a$ and $b$, respectively, which are arranged crosswise of said strips and extend nearly the entire width thereof, reserving the solid broad sections $c$ between said perforations, and also the connecting edge portions $d$. Said perforations are all of a uniform size, as are also the solid portions $c$ therebetween, and the latter are designed to overlap the former when properly assembled. These strips are assembled by simply slipping one into the other, as shown in Fig. 1, and adjusting the two so that the perforations of the inner strip will properly register with the solid portion $c$ of the other strip, and in this manner secure the two together in any suitable way. It will thus be obvious that the several ring-like sections $c$ act somewhat independent of each other in their operations, and readily yield with the tire, and, further, that the successive sections will obviously operate in a similar manner with the rotation of the wheel. We preferably roll in the two edges $e\ e$ of the outer strip, as will be seen from Figs. 1, 2, and 4 of the drawings, which serve to retain the inner strip in its proper position and retain the perforations of one strip directly over the sections $c$ of the other.

We are aware that it is not broadly new to employ thin sheet-metal guards or armor to protect inflected tires, as we know that patents have been granted for various constructions embodying this principle. What we consider new and desire to cover in this application is two strips of metal, one within the other, both of which practically encircle the tire and are provided with perforations, substantially as herein shown, and so arranged that those of one section do not register with those of the adjoining strip.

Having thus described our invention, what we claim, and desire to secure by Letters Patent of the United States, is—

1. As a new article of manufacture, a pneumatic tire of any suitable material, provided with a non-puncturable shield substantially as herein shown and consisting of two thin sheet-metal strips, one within the other, each provided with suitable central perforations, those of one strip being arranged alternately with those of the other.

2. As a new article of manufacture, a pneumatic tire provided with two thin sheet-metal strips, one within the other, each provided with similar central perforations extending crosswise of said strips, and so arranged that those of one strip register with the solid portion of the other, substantially as described.

Signed at Bridgeport, in the county of Fairfield and State of Connecticut, this 14th day of March, A. D. 1896.

FRED M. BROWN.
EDWARD J. BROSNAN.

Witnesses:
C. M. NEWMAN,
HARRIET SLASON.